(12) United States Patent
Schumacher et al.

(10) Patent No.: US 11,701,840 B2
(45) Date of Patent: Jul. 18, 2023

(54) CONNECTION METHOD FOR CHASSIS SEALING ELEMENTS

(71) Applicant: CQLT SAARGUMMI TECHNOLOGIES S.À.R.L., Remich (LU)

(72) Inventors: Volker Schumacher, Schmelz (DE); Bernard Tessier, Moulon (FR)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 0 days.

(21) Appl. No.: 16/976,929

(22) PCT Filed: May 2, 2019

(86) PCT No.: PCT/EP2019/061286
§ 371 (c)(1),
(2) Date: Aug. 31, 2020

(87) PCT Pub. No.: WO2019/211395
PCT Pub. Date: Nov. 7, 2019

(65) Prior Publication Data
US 2021/0008812 A1    Jan. 14, 2021

(30) Foreign Application Priority Data

May 2, 2018   (DE) ..................... 10 2018 110 496.0
Jun. 28, 2018  (DE) ..................... 10 2018 115 622.7

(51) Int. Cl.
*B29C 65/48*    (2006.01)
*B60J 10/23*    (2016.01)
(Continued)

(52) U.S. Cl.
CPC ...... *B29C 65/4815* (2013.01); *B29C 66/1142* (2013.01); *B29L 2031/26* (2013.01);
(Continued)

(58) Field of Classification Search
CPC .............. B60J 10/2335; B29C 66/5261; B29C 66/1142; B29C 65/4815; B32B 2037/1238; B32B 37/1284; B32B 37/1292
See application file for complete search history.

(56) References Cited

U.S. PATENT DOCUMENTS 2,974,079 A * 3/1961 Korotkevich ...... B29K 2021/00
277/631
6,083,558 A * 7/2000 Bremont ............... B29C 66/474
427/195
(Continued)

FOREIGN PATENT DOCUMENTS

CN   1380204 A   11/2002
CN  105751488 A   7/2016
(Continued)

OTHER PUBLICATIONS

Chinese Office Action dated Jun. 16, 2021, 7 Pages.
Chinese Office Action and English Translation Thereof, dated Dec. 27, 2021, 12 Pages.

*Primary Examiner* — Scott W Dodds
(74) *Attorney, Agent, or Firm* — Lucas & Mercanti, LLP; Klaus P. Stoffel (57) ABSTRACT

A method for connecting the joint of two ends of at least one chassis sealing element. In order to allow a secure and quick connection of the ends and allow an additional unhindered passage of air and moisture between hollow chambers within the chassis sealing element via the joint when using a profiled hollow chamber, the ends are first arranged at a distance to each other, and a shapeless bonding agent is applied to at least one end. The bonding agent is then heated, and the ends are brought into mutual contact, whereby the ends are bonded at the joint by way of the heated bonding agent.

19 Claims, 5 Drawing Sheets

(51) Int. Cl.
*B29C 65/00* (2006.01)
*B29L 31/26* (2006.01)
*B60R 13/06* (2006.01)
*B32B 37/12* (2006.01)

(52) U.S. Cl.
CPC ... *B32B 2037/1238* (2013.01); *B60J 10/2335* (2016.02); *B60R 13/06* (2013.01)

(56) References Cited

U.S. PATENT DOCUMENTS

| | | | |
|---|---|---|---|
| 7,914,642 B2 | 3/2011 | Grohmann | |
| 10,820,680 B1* | 11/2020 | Macri | A45D 40/30 |
| 2002/0164201 A1* | 11/2002 | Lempfer | B29C 66/71 |
| | | | 403/267 |
| 2003/0138582 A1* | 7/2003 | Miller | A61M 25/0045 |
| | | | 428/36.9 |
| 2012/0103660 A1* | 5/2012 | Gupta | B05D 5/00 |
| | | | 156/60 |
| 2014/0096905 A1* | 4/2014 | van Heijningen | B05C 17/06 |
| | | | 156/289 |
| 2019/0226583 A1 | 7/2019 | Kast | |

FOREIGN PATENT DOCUMENTS

| | | |
|---|---|---|
| DE | 2737158 A1 | 2/1979 |
| DE | 3906278 A1 | 8/1990 |
| DE | 102016119520 A1 | 4/2018 |
| EP | 0665261 A2 | 8/1995 |
| EP | 1995101 A1 | 11/2008 |
| EP | 1915270 B1 | 3/2009 |
| JP | S5224278 A | 2/1977 |
| JP | H048781 A | 1/1992 |
| WO | 0189811 A1 | 11/2001 |
| WO | 2017178017 A1 | 10/2017 |

* cited by examiner

CONNECTION METHOD FOR CHASSIS SEALING ELEMENTS

The present application is a 371 of International application PCT/EP2019/061286, filed May 2, 2019, which claims priority of DE 10 2018 110 496.0, filed May 2, 2018, and DE 10 2018 115 622.7, filed Jun. 28, 2018, the priority of these applications is hereby claimed and these applications are incorporated herein by reference.

BACKGROUND OF THE INVENTION

The invention relates to a method for connecting the joint of two ends of at least one chassis sealing element, in particular a motor vehicle seal. The invention furthermore relates to a device for carrying out the method.

Corresponding chassis sealing elements are used in motor vehicles in order to seal off components, such as, for example, a door and the corresponding door frame, from one another. The chassis sealing element serves both the purpose of protection against the penetration of moisture, noise or dirt as well as thermal insulation. In order to ensure as seamless as possible sealing off, several chassis sealing elements which are partially formed differently are often connected to one another in a firmly bonded manner at the ends, for example, by means of gluing or heat sealing.

In order to enable process automation of a corresponding connection method, EP 1 915 270 B1 proposes, in the case of a chassis sealing element attached to the surface of a vehicle in the form of a seal profile, arranging the profile ends at a distance from one another and introducing a welding film into the generated gap, which welding film is initially heated and subsequently pushed against the opposite profile ends of the seal profile in order to heat seal these. After the connection of the profile ends, the protruding residues of the welding film can be manually removed, in so far as these are accessible. If, however, the seal profile has hollow chambers, these are closed off by the welding film and thus the exchange of air or the outflow of fluid in the hollow chambers beyond the joint is prevented. It is known from WO 01/89811 A1 to provide such a welding film with a plurality of slots or introduce through-holes into the film in order to enable a penetration of air between the hollow chambers beyond the joint. Since, despite corresponding slots or incorporated holes, a reduction in cross-section is, however, always present at the joint, a welding film processed in such a manner also impedes the penetration of air and moisture between the hollow chambers via the joint. Precisely in the case of horizontal bearing of the seal profile in the region of the joint, an accumulation of fluid can also arise, for example, condensation water which collects in a lower region of the hollow chamber as a result of gravity and cannot flow out via a hole arranged centrally in relation to the hollow chamber in the welding film.

SUMMARY OF THE INVENTION

The object of the invention is to create a method for connecting the joint of two ends of at least one chassis sealing element which enables a secure and rapid connection of the ends and, in the case of the use of chassis sealing elements with one or more hollow chambers, additionally unhindered passage of air and humidity between hollow chambers within the chassis sealing element beyond the joint.

This object is achieved in that, according to the methods, the ends are initially arranged spaced apart from one another and a shapeless bonding agent is applied onto at least one end. The bonding agent is subsequently heated and the ends are simultaneously or subsequently brought into mutual contact, as a result of which the ends are connected in a firmly bonded manner at the joint by the heated bonding agent. Heating of the bonding agent can be performed prior to mutual contact of the ends at the joint or only after contact. In this manner, both the ends of a chassis sealing element can be connected to one another to form an annular seal as well as the ends of several separate chassis sealing elements with the same or with an adequate overlapping region at the connection point also of a different cross-section in order to form a transition.

The chassis sealing elements can involve seal profiles, i.e. elongate seals with a constant cross-section normally produced by means of extrusion, or molded parts of any geometry, for example, corner pieces produced using the injection molding process. The bonding agent can furthermore be applied on the entire end of the chassis sealing element or only on a sub-region of the contact surface. The term end of the chassis sealing element refers to that contact surface on a chassis sealing element to which the further end thereof or one end of a further chassis sealing element should be fastened. This contact surface can therefore be provided everywhere on a chassis sealing element and is spatially not restricted to an upstream end region.

Instead of only one end, the bonding agent can also be applied onto both opposite ends, as a result of which the holding force is increased where applicable. The application of the bonding agent and the connection of the ends in the same machine or in different machines can also be performed with a time interval. For example, it is conceivable that, in the case of chassis sealing elements in the form of elongate seal profiles, during cutting to length of corresponding seal profiles, a bonding agent is already applied onto at least one profile end, but the seal profiles are stored in the interim and connected to one another by heating of the bonding agent in a later working step, where applicable, also only directly on the vehicle.

A bulk material, in particular powder (particularly preferably with a grain size smaller than 200 µm) or granulate, a fluid or a paste can preferably be used as a shapeless bonding agent. As a result of this, it is possible to apply the bonding agent onto the ends in an exactly metered and thus efficient manner so that no significant reduction in the cross-section of the hollow chamber arises at the joint as a result of protruding bonding agent. A correspondingly shapeless bonding agent can furthermore be readily applied universally in the case of each profile cross-section or each contact surface.

The bonding agent can particularly preferably be applied directly or via a subcarrier onto the at least one end. A plate onto which the shapeless bonding agent is applied corresponding to the contact surface of the chassis sealing element to be connected can serve, for example, as a subcarrier. Here, it is furthermore possible to prepare several such subcarriers with bonding agent in a parallel working process in order to achieve a particularly high clock rate during connection of the chassis sealing elements. The application of the bonding agent can be performed manually, in a partially automated manner or fully automated manner.

The bonding agent can be applied by spraying on, rolling on or pointwise application directly onto the at least one end and/or the subcarrier. The adhesion on the end or the subcarrier can be brought about by means of adhesion or electrostatic charge, as is known in the case of powder coating for metal coating. Spraying on can preferably be performed in a closed chamber in which excess bonding agent is sucked away and reused. The subcarrier and/or the end can furthermore be heated in order to facilitate an adhesion of the bonding agent. A particularly precise application of bonding agent can be achieved by means of a robot-guided spray or extrusion nozzle. To this end, for example, a guide frame can be provided which enables a movement of the nozzle parallel to the joint so that with the nozzle the bonding agent can be applied in a similar manner to the melt layer process in a pointwise manner in the form of individual bonding agent points, linearly in the form of a bead or also superficially on the at least one end or on the subcarrier.

Alternatively or additionally, the bonding agent and/or the at least one end or the subcarrier can be electrostatically charged in order to hold the bonding agent, in particular in a pointwise manner. The subcarrier can be electrostatically charged in a locally restricted manner like the image drum of a laser printer so that the particles of the bonding agent only correspondingly oppositely charged there electrostatically adhere. In order to facilitate the transfer of the bonding agent from the subcarrier to the at least one end, it can furthermore be provided to discharge the subcarrier as soon as the bonding agent comes into contact with the end. As a result of this, a detachment of the bonding agent from the subcarrier and an application of the bonding agent onto the at least one end are advantageously facilitated.

In an alternative embodiment, the bonding agent can also be applied by contacting of the at least one end to a bonding agent layer or to a subcarrier. Here, the bonding agent in particular with a defined layer thickness can be provided in a container so that, in the case of the at least one end contacting the bonding agent layer, a defined quantity of bonding agent is applied. This can, for example, be achieved in that, before each contacting, a scraper with a defined distance to the base of the container scrapes away excess bonding agent so that only a defined layer thickness of bonding agent remains on the container base.

Heating of the bonding agent applied onto the at least one end can preferably be performed with the aid of a heating apparatus, in particular an IR heating element, a hot air fan or a laser. Alternatively, a microwave generator can also be used in order to preferably heat metal particles provided in the bonding agent. The bonding agent is preferably melted by the heating apparatus, i.e. heated at least to a specific melting temperature, so that the bonding agent becomes viscous/fluid and adheres particularly well to the opposite ends. Instead of the heating apparatus, however, the residual heat of the chassis sealing element from an upstream processing step, for example, extrusion of the chassis sealing element as a seal profile, can also be used to heat the bonding agent. As soon as the bonding agent is cooled, it forms a firmly bonded connection between the ends.

It can furthermore be provided that the subcarrier and/or the at least one end are/is additionally heated prior to the application of the bonding agent in order to facilitate the adhesion of the bonding agent to the subcarrier or the end. The end can be heated in a separate processing step or have a residual heat from an upstream processing step, for example, the extrusion of the chassis sealing element as a seal profile. Here, the subcarrier and/or the at least one end are/is, prior to the application of the bonding agent, preferably heated to a temperature which lies below the melting temperature of the bonding agent. Accordingly, the bonding agent is not melted in the event of contact with the subcarrier or the at least one end, rather is merely softened, as a result of which the adhesion to the subcarrier or the at least one end is improved. Heating of the bonding agent can be achieved directly by thermal input into the bonding agent and indirectly by heating of the subcarrier or the at least one end. The bonding agent, the subcarrier and/or the at least one end can advantageously, prior to contact with the bonding agent, be heated to a temperature below the melting temperature, preferably to up to 200° C., in particular up to 150° C., and a heating of the bonding agent at least to the melting temperature, in particular to a temperature of 120° C. to 300° C., is advantageous for connection of the ends of the at least one chassis sealing element.

In order to enable a precise application of the bonding agent onto the subcarrier or the at least one end, it can be provided that portions of the subcarrier or the at least one chassis sealing element onto which no bonding agent should be applied are covered by means of a template. The template can be used such that it, in the case of heating of the subcarrier, the at least one end and/or the bonding agent, covers the other portions of the subcarrier or of the chassis sealing element against thermal radiation and/or during application of the bonding agent, for example, by means of spraying on or rolling on prevents contact of the bonding agent with the other portions of the subcarrier and/or of the chassis sealing element. The template can be correspondingly prepared, for example, electrostatically charged, cooled and/or coated in order to prevent an adhesion of the bonding agent to the template.

The bonding agent preferably comprises a thermoplastic and/or duroplastic material, wherein the thermoplastic material can be liquefied by heating and the duroplastic material hardens under the action of heat and/or as a result of chemical reaction. The bonding agent can furthermore be formed from one substance or as a mixture of substances, for example, as a paste (suspension) with a high content of solids. In particular for the connection of chassis sealing elements composed of different materials, the bonding agent can also be composed in multiple layers from at least two components, wherein a first component offers a particularly good adhesive action with the material of the first chassis sealing element and the second component offers a particularly good adhesive action with the material of the second chassis sealing element. The two components of the bonding agent can be selected such that they furthermore adhere well to one another, alternatively, however, at least one further component can also be provided between the two components, which further component acts, among other things, as an adhesion promoter between the two outer components. The at least two components can be applied separately onto the ends to be connected and only be connected in the case of subsequent connection of the ends. It is alternatively, however, also possible to apply the two components in particular in layers onto an end of the chassis sealing element, wherein the component designed for the material of this chassis sealing element is applied first and subsequently, possibly after the application of one or more intermediate layers, the second component is applied which enables a particularly good connection to the material of the further chassis sealing element.

The second component then first comes into contact with the further chassis sealing element when the two ends of the chassis sealing element are connected.

The application of the shapeless bonding agent can be performed prior to fastening of the chassis sealing element to a chassis of a vehicle and/or during or after an at least partial fastening of the chassis sealing element to the chassis.

If the application of the shapeless bonding agent is performed prior to the fastening of the chassis sealing element to the chassis, chassis sealing elements provided with the shapeless bonding agent can be produced in a separate step. This enables the preparation of already cut-to-length chassis sealing elements provided with shapeless bonding agent, where applicable, at the manufacturer of the chassis sealing elements so that mounting on the vehicle can be performed particularly quickly. In this case, the profile ends can be connected prior to mounting of the chassis sealing element on the chassis or also during or after mounting of the chassis sealing element on the chassis by the bonding agent.

In the case of application of the shapeless bonding agent during or also after at least partial fastening of the chassis sealing element to the chassis, several working steps can be performed simultaneously which results in particularly short production times. Thus, for example, the shapeless bonding agent can be applied onto a first end, already fastened to the chassis, of the chassis sealing element, while the other portion of the chassis sealing element is still fastened to the chassis.

The chassis sealing element can be cut to length and stocked prior to fastening to a chassis of a vehicle in an exact manner to the required length or with oversize. During cutting to length with oversize, the chassis sealing element is normally cut to length to be longer by a small excess length of e.g. 1-500 mm in order to balance out tolerances. The cutting to length can preferably first be carried out in the course of the mounting process of the seal element to the vehicle door, in particular after the at least partial or complete fastening of the chassis sealing element to the chassis of the vehicle so that the cutting to length is performed particularly precisely and a gap between the ends is avoided.

Alternatively, it can also be provided that the chassis sealing element is removed from a supply coil and is only cut to length after an at least partial fastening to a chassis of a vehicle. Such a supply coil is also referred to as an endless cord and comprises a profile seal which has a multiple of the length of an individual chassis sealing element to be attached to the chassis, wherein the individual chassis sealing elements are generated by separation from the supply coil in the desired length. A supply coil has the advantage that, as a result of this, a large number of individual chassis sealing elements can be produced and the supply coil can be stored in a particularly space-saving manner and easily supplied to the manufacturer of the vehicles. In the case of advantageous processing of a supply coil or endless cord, the cutting to length of the chassis sealing element is carried out as a function of the respective vehicle type and thus highly individually only directly in the production process of the vehicle manufacturer so that the vehicle manufacturer does not have to stock different lengths of chassis sealing elements. Current door seals of a car normally have a length of approx. 3.5 m, the delivery form of a currently normal supply coil or continuous seal is at times more than 100 times the length of an individual chassis sealing element.

The shapeless bonding agent can be applied to an end of the chassis sealing element prior to cutting to length, for example, onto the free end of the sealing cord located on the supply coil. The chassis sealing can then be mounted directly from the supply coil possibly by machine onto the chassis and subsequently cut to length. Prior to the connection of the two ends, a shapeless bonding agent can then, where applicable, additionally also be applied onto the second end. Alternatively, however, the application of the shapeless bonding agent onto at least one of the ends can only be performed after the cutting to length of the chassis sealing element. If the chassis sealing element is cut to length/shortened to the desired length directly in an accurate manner, the shapeless bonding agent can be applied on one or both ends. If the chassis sealing element is firstly cut to length with oversize, the shapeless bonding agent can already be applied onto one end and after accurate cutting to length possibly also onto the further end. Alternatively, the shapeless bonding agent can be applied onto one or both ends after the chassis sealing element has been cut to length from the oversize to the accurately fitting length. In each case, it has been shown to be particularly advantageous to apply the shapeless bonding agent shortly after the cutting to length/cutting of the chassis sealing element onto the corresponding end since the shapeless bonding agent then adheres particularly well.

In a particularly advantageous embodiment, the connection of the two profile ends of the chassis sealing element can be integrated into the mounting process of the automotive manufacturer in a machine, where applicable, by machine of the chassis sealing element on the vehicle door or chassis. In the case of the variant in which the chassis sealing element is processed from a supply coil, the shapeless bonding agent can consequently be applied during three different process steps onto, in each case according to the process step, one free profile end or both profile ends of the chassis sealing element (see following variants A-C).

A) Prior to the start of mounting of a chassis sealing element which has not yet been cut to length on the chassis of a vehicle, a shapeless bonding agent can be applied onto the profile end, which is already freely accessible on one side at this point in time, of the chassis sealing element.

B) During mounting of the at least already partially fastened, but not yet cut-to-length sealing element, a shapeless bonding agent can be applied onto the profile end, which is freely accessible on one side at this point in time, of the chassis sealing element.

C) After mounting and cutting to length of the chassis sealing element, a shapeless bonding agent can be applied onto one or both of the profile ends, which are then freely accessible at this point in time, of the chassis sealing element.

Variants A-C can also be combined so that, for example, prior to the start of mounting of the chassis sealing element on the chassis, the shapeless bonding agent is applied onto the one already accessible profile end of the sealing element (variant A) and after the mounting and the cutting to length of the sealing element, the shapeless bonding agent is additionally applied onto the further profile end which is then accessible.

Should a smaller gap be present between the free ends of the sealing element after mounting of the sealing element on the vehicle door, this can thus be permanently closed by a pushing together of the ends during connection by the bonding agent.

In the case of the variant of the cutting to length of the chassis sealing element from a supply coil or an endless cord and thus an application of the bonding agent only in the production plant of the vehicle manufacturer, it is possible to apply the shapeless bonding agent immediately before the attachment of the chassis sealing element on the vehicle door onto the free profile end which is already present on one side at this point in time prior to the start of mounting of the chassis sealing element and only subsequently to start with the mounting process of the seal. Process heat possibly introduced for the application of the bonding agent can furthermore in the case of the subsequent connection process be further used directly during subsequent connection of the profile ends.

If the shapeless bonding agent is only applied when the at least one chassis sealing element is at least in portions fastened to the chassis of a vehicle, for example, a vehicle door, this has the advantage that the application of the bonding agent and the connection of the profile ends can be achieved in rapid succession and directly on the vehicle so that particularly efficient manufacture is enabled. For example, the cutting to length can be configured depending on the respective vehicle type and thus very individually so that different lengths of chassis sealing elements do not have to be stocked and the chassis sealing elements can be supplied to the manufacturer of the vehicles in the form of a supply coil or an endless cord which has a multiple of the length of an individual chassis sealing element to be attached to the chassis. Mounting of the chassis sealing element on the chassis is performed e.g. by unwinding the sealing profile from the supply coil or the endless cord and fastening directly to the chassis, wherein the chassis sealing element is advantageously only cut to length when the profile end to be connected is reached so that no or only a very small gap is present between the profile ends. During the subsequent connection process, process heat possibly introduced for the application of the bonding agent can furthermore be further used directly during subsequent connection of the profile ends.

A device for carrying out the described method is furthermore claimed which comprises a holding apparatus for positionally accurate retention of the at least one end and an application apparatus for application of a shapeless bonding agent onto the at least one end.

In one advantageous embodiment, the device can furthermore have a heating apparatus for heating the bonding agent applied onto the at least one profile end and a positioning apparatus for mutual pushing on of the profile ends. A subcarrier can furthermore be provided by means of which the bonding agent is applied onto the at least one profile end.

A particularly rapid and positionally accurate application of the bonding agent can be achieved in that the application apparatus is formed as an injection or extrusion nozzle or as an application roller. Alternatively, the application apparatus can also comprise a bonding agent container in particular with a laterally movable scraper which has a defined height above the container base and thus the bonding agent in the container base can be scraped away up to a specific uniform height.

The heating apparatus can advantageously be formed as an IR heating element, hot air fan, microwave generator or laser, with which the at least one profile end can be heated quickly and in a spatially restricted manner.

In order to position the bonding agent in a particularly positionally accurate manner, the device can comprise a template for covering those portions of the sealing profile onto which no bonding agent is supposed to be applied.

BRIEF DESCRIPTION OF THE DRAWING

Further particular features and advantages of the invention will become apparent from the following description of a preferred exemplary embodiment on the basis of the drawings. In the drawings.

DETAILED DESCRIPTION OF THE INVENTION

Figure 1:
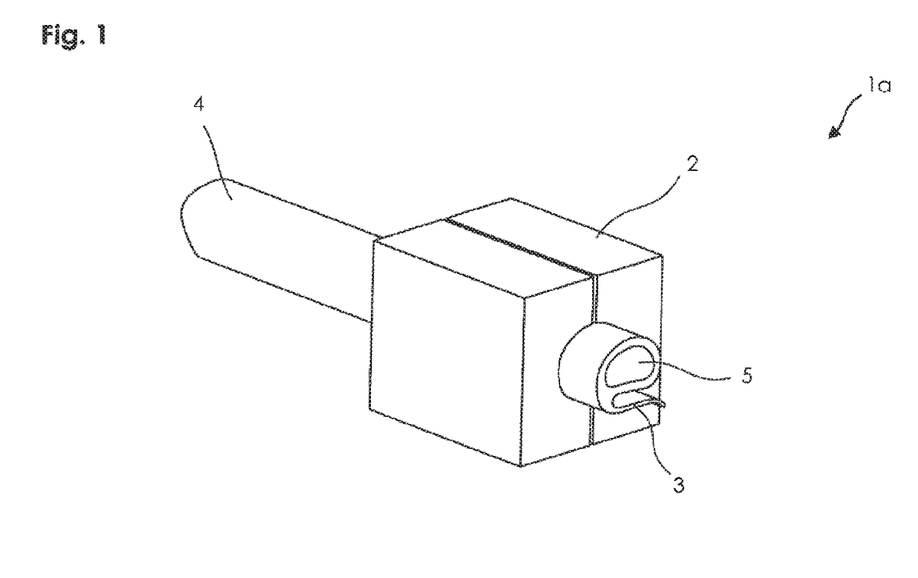
FIG. 1 shows a perspective representation of a device for the connection of seal profiles to a profile end, held in a holding apparatus, of a seal profile.

FIG. 1 shows a schematic representation of a device 1a for connecting the joint of two profile ends of a chassis sealing element formed as an elongate seal profile.

Device 1a comprises a holding apparatus 2 in which a first profile end 3 of a seal profile 4 is held. Seal profile 4 involves a seal cord as is used in the vehicle sector, for example, to seal off doors or windows. Seal profile 4 has a hollow chamber 5 which extends over the entire length of seal profile 4. In order to securely hold seal profile 4, holding apparatus 2 is formed in multiple parts and engages around seal profile 4. Holding apparatus 2 has, for this purpose, an inner contour which corresponds to the outer contour of seal profile 4 so that a secure frictionally engaged holding of seal profile 4 is ensured by the bearing over a large surface area.

Profile end 3 projects slightly with respect to holding apparatus 2, but it can also be provided that seal profile 4 is positioned in holding apparatus 2 in such a manner that this terminates flush with the holding apparatus.

Figure 2:
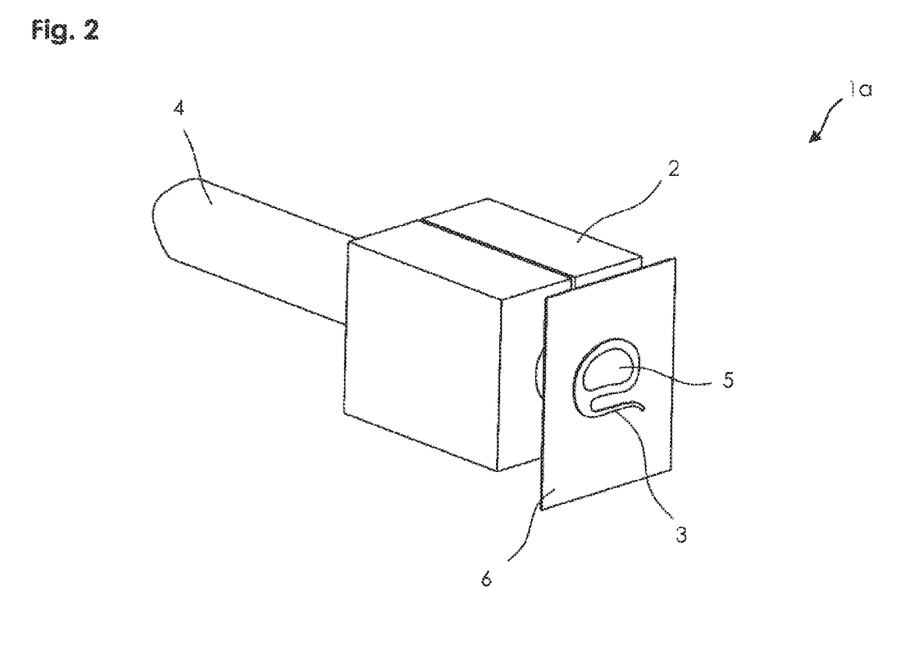
FIG. 2 shows the arrangement from FIG. 1 with a template for covering specific portions of the seal profile.

The arrangement from FIG. 1 in a further process step is shown in FIG. 2. In order to prepare the application of a bonding agent and ensure that the bonding agent is only applied on the front side of profile end 3, a template 6 is used which is formed in the form of a thin panel and has a recess corresponding to the cross-section of the seal profile. Template 6 is positioned in such a manner that profile end 3 is arranged in the recess and the face side of profile end 3 terminates flush with template 6. As a result of this, those portions of seal profile 4 onto which no bonding agent is supposed to be applied are reliably covered.

Figure 3:
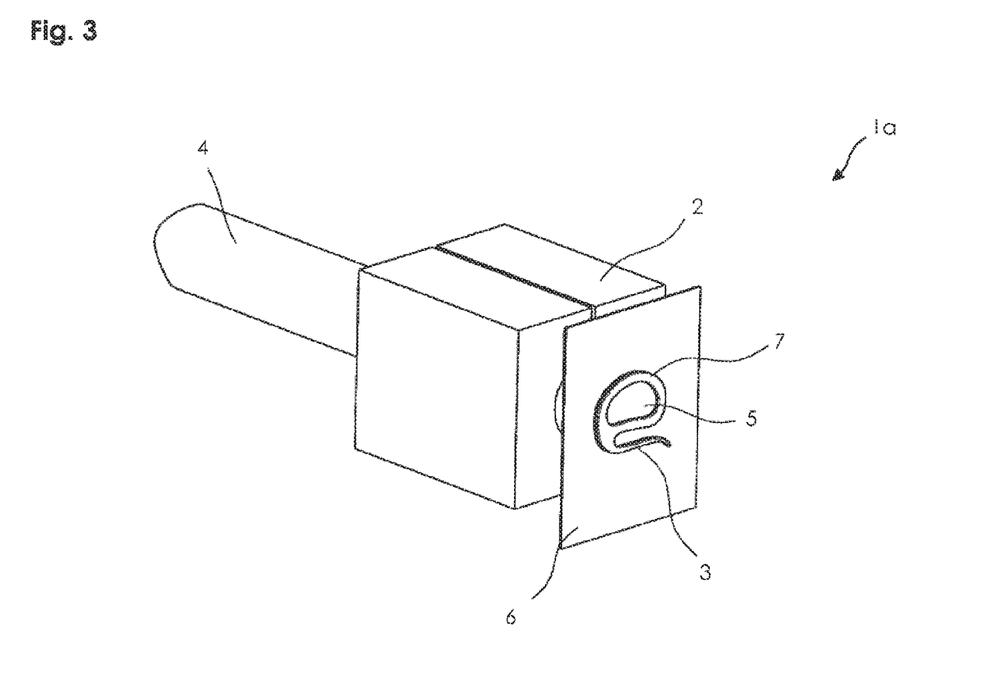
FIG. 3 shows the arrangement from FIG. 2 with a bonding agent applied onto the profile end.

FIG. 3 shows the arrangement from FIG. 2 in a subsequent process step. A bonding agent 7 is applied in a thin surface onto profile end 3 on the front side by means of an application apparatus not represented here. The application apparatus can be, for example, an injection nozzle for spraying on a bonding agent in liquid or powder form or an application roller for application of a liquid bonding agent. As a result of template 6, it is ensured that bonding agent 7 is applied solely onto the front side of profile end 3.

Figure 4:
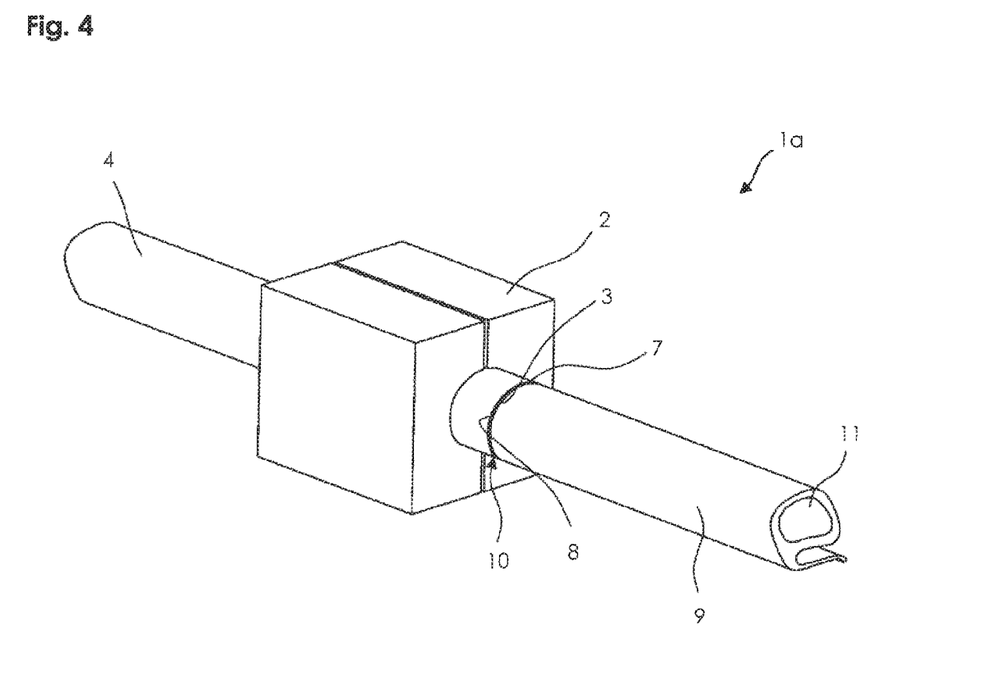
FIG. 4 shows the arrangement from FIG. 3 with a further profile end connected by the bonding agent to the profile end.

FIG. 4 shows the arrangement from FIG. 3 in a further process step. By means of a heating apparatus, not represented, binding agent 7 is heated and a profile end 8 of a further seal profile 9 is pushed against first profile end 3. As a result of this, profile ends 3, 8 are connected in a materially engaged manner at resultant joint 10. Instead of profile end 8 of a further seal profile 9, the second profile end of seal profile 4 can also be connected to first profile end 3 so that an annular seal profile 4 is produced.

The cross-section of further seal profile 9 is formed to be identical to the cross-section of seal profile 4, in particular a corresponding hollow chamber 11 is also provided there. As a result of the precise application of bonding agent 7 on the front side of first profile end 3, during connection of profile ends 3, 8, no significant reduction in cross-section arises so that air and fluid can penetrate unhindered between hollow chambers 5, 11 of seal profiles 4, 9 through joint 10.

Figure 5:
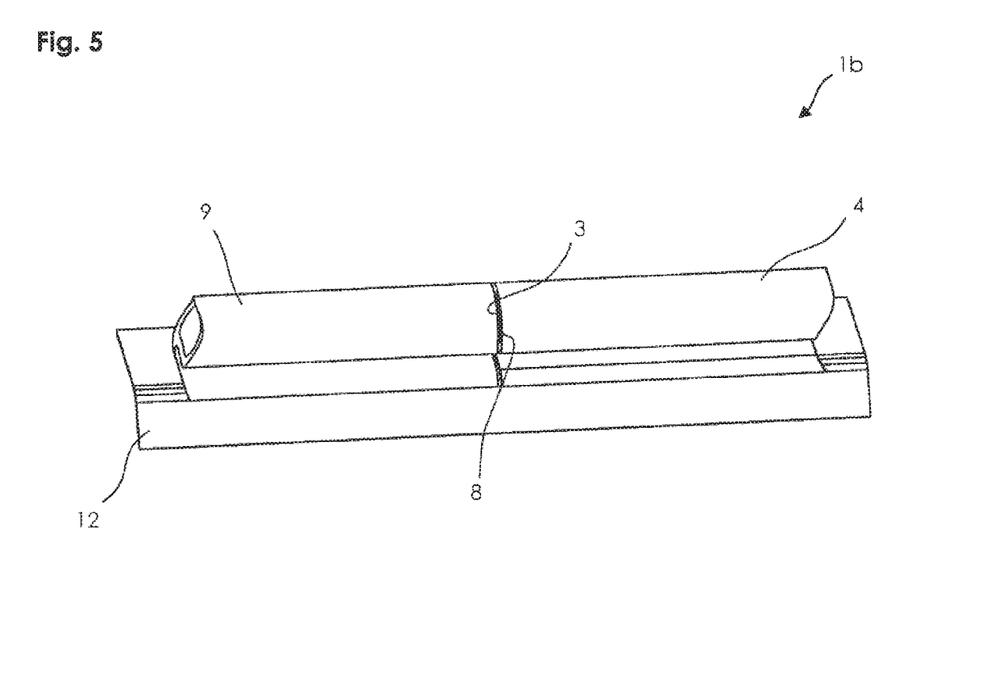
FIG. 5 shows a perspective representation of a first method step for connection of seal profiles on a vehicle chassis.

FIG. 5 shows a perspective representation of a first method step for the connection of seal profiles 4, 9 which, in contrast to the configuration shown in FIGS. 1-4, is fastened directly to chassis 12 of a vehicle. Seal profiles 4, 9 can involve the same profile of a chassis sealing element which is unwound, for example, from a roll as an endless cord and has been fastened to chassis 12 until ends 3, 8 are opposite one another preferably without a gap. For as small as possible a gap size, the cutting to length of the chassis sealing element from the endless cord can furthermore only be performed after the unwinding and fastening to chassis 12 when the profile end to be connected is reached during unwinding. Alternatively, seal profiles 4, 9 can also be formed separately and only be opposite one another at profile ends 3, 8. The separation of the profile can, as shown in the drawings, be performed at an angle of 90°, i.e. perpendicular to the longitudinal direction, but also as a diagonal cut at an angle which deviates from 90°, such as e.g. 45°.

Figure 6:
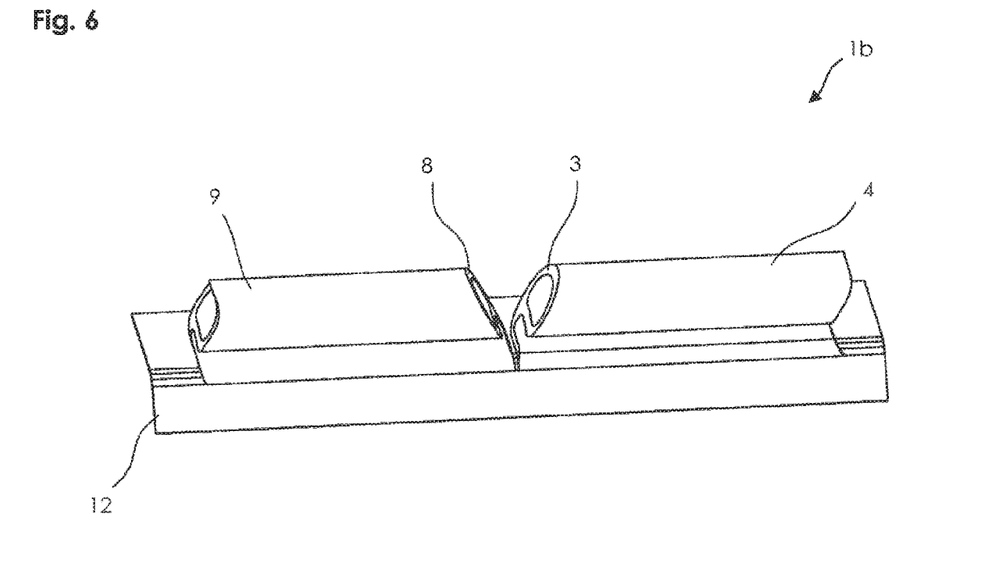
FIG. 6 shows a perspective representation of a second method step for connection of seal profiles on a vehicle chassis.

FIG. 6 shows a perspective representation of a second method step for connection of seal profiles 4, 9 from FIG. 5. Proceeding from the arrangement represented in FIG. 5, in this case, seal profiles 4, 9 are pulled apart at profile ends 3, 8 by means of a gripping apparatus, not represented, in order to increase the size of the gap between profile ends 3, 8. In this method step, where applicable, a heating of profile ends 3, 8 can be performed as preparation for the application of shapeless bonding agent 7.

Figure 7:
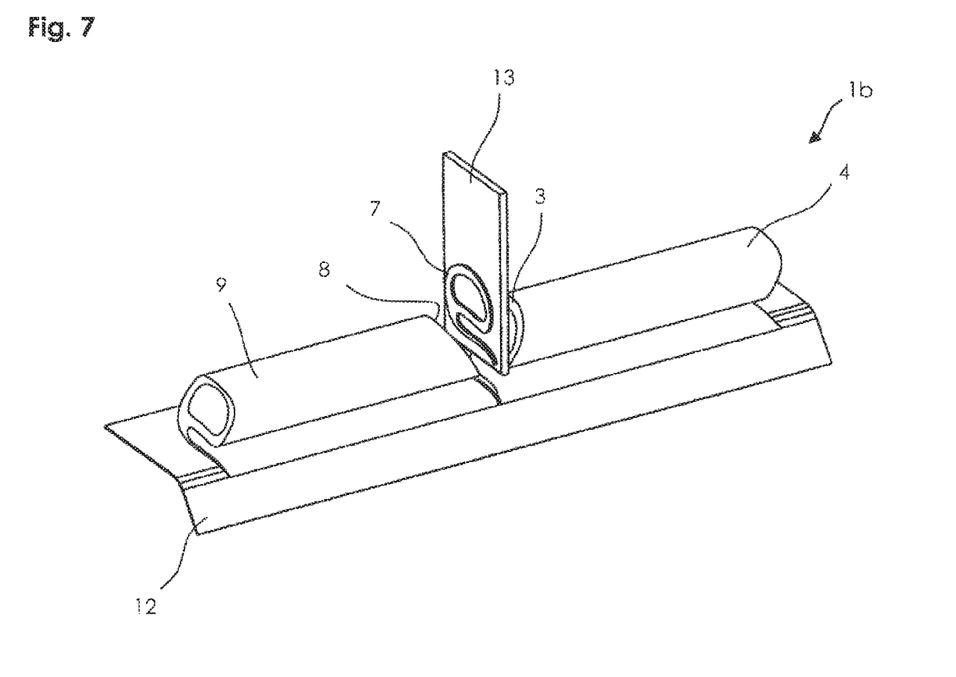
FIG. 7 shows a perspective representation of a third method step for connection of seal profiles on a vehicle chassis.

FIG. 7 shows a perspective representation of a third method step for connection of seal profiles 4, 9 on chassis 12. Proceeding from the method step shown in FIG. 6, in this case, a subcarrier 13 with a shapeless bonding agent 7 held detachably thereon is moved into the gap between profile ends 3, 8 and shapeless bonding agent 7 is positioned with respect to at least one of profile ends 3, 8 so that it can be applied onto the at least one profile end 3, 8. In the case of the exemplary embodiment shown here, shapeless bonding agent 7 is formed according to the cross-sectional form of seal profiles 4, 9 at profile ends 3, 8 and applied by means of spraying on or rolling onto subcarrier 13. Shapeless bonding agent 7 can, however, also be arranged in another arrangement, for example, in a punctiform manner and in particular distributed over the entire surface, on subcarrier 13. In terms of the various application possibilities onto the subcarrier, the different possibilities of adhesion of shapeless bonding agent on subcarrier 13, for example, by means of electrostatic charging, as well as the possibilities for the transfer of shapeless bonding agent 7 to profile ends 3, 8, reference is made to the above general statements.

For transfer of shapeless bonding agent 7 to the at least one profile end 3, 8, it is provided in the case of the embodiment shown that the gripping apparatus, not represented, moves profile ends 3, 8 toward one another and thus pushes against shapeless bonding agent 7 on subcarrier 13, as a result of which shapeless bonding agent is transferred to profile ends 3, 8. Shapeless bonding agent 7 can be applied onto both sides, opposite profile ends 3, 8, of subcarrier 13 in order to provide both profile ends 3, 8 in one working step with a shapeless bonding agent 7. Alternatively, shapeless bonding agent 7 can also only be transferred from one side of subcarrier 13 onto one of profile ends 3, 8. As soon as shapeless bonding agent 7 has been transferred onto the at least one profile end 3, 8, subcarrier 13 is removed from the gap between profile ends 3, 8.

Figure 8:
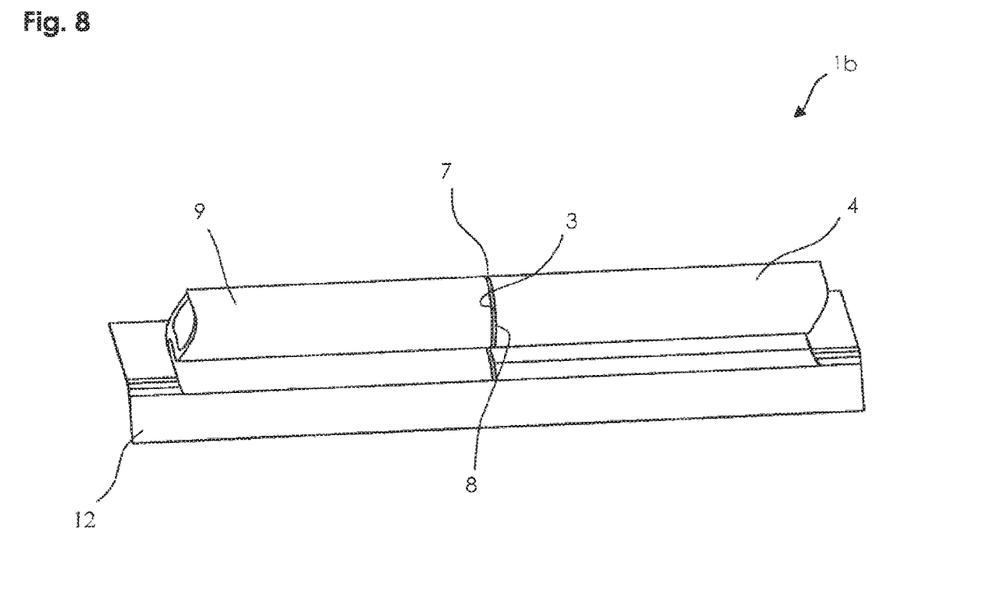
FIG. 8 shows a perspective representation of a fourth method step for connection of seal profiles on a vehicle chassis.

FIG. 8 shows a perspective representation of a fourth method step for connection of seal profiles 4, 9 on chassis 12. In this method step, profile ends 3, 8 are pushed together by means of the gripping apparatus, not represented, so that these are connected in a firmly bonded manner with shapeless bonding agent 7. As soon as shapeless bonding agent 7 is sufficiently cooled, the gripping apparatus, not represented, can be removed from seal profiles 4, 9, as a result of which the connection process is concluded.

Figure 9:
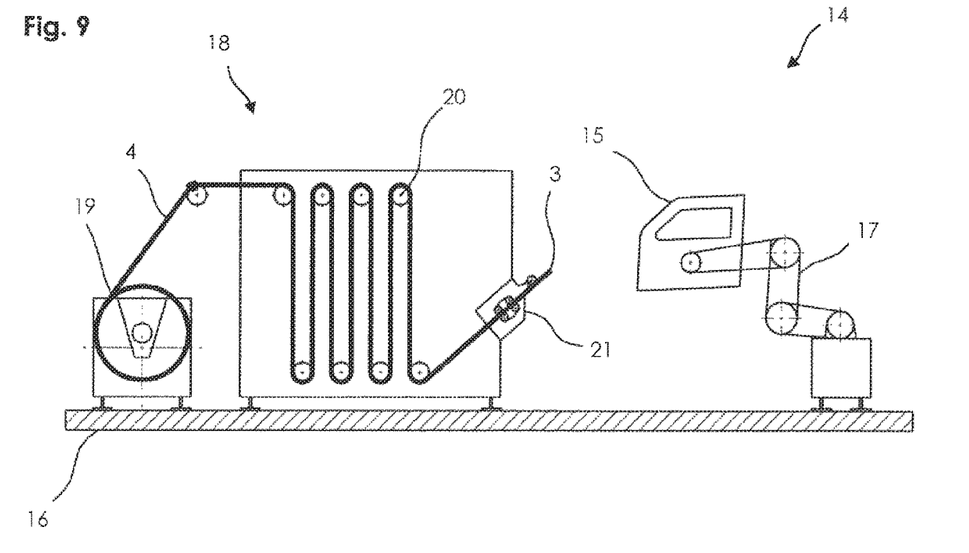
FIG. 9 shows a schematic representation of a device for mounting a seal profile on a vehicle door.

FIG. 9 shows a schematic representation of a device 14 for mounting a chassis sealing profile on a vehicle chassis in the form of a vehicle door 15. Mounting device 14 is supported on a base 16 and comprises a robot 17 with a holding arm for precise movement and positioning of vehicle door 15 as well as a supply apparatus 18 for the supply of a seal profile 4 to vehicle door 15. Supply device 18 comprises, for this purpose, a supply coil 19 in which seal profile 4 is preferably wound up as what is known as an endless cord, the length of which corresponds to a multiple of the length of the cut-to-length chassis sealing element.

Seal profile 4 is guided from supply coil 19 via several displaceable deflection rollers 20, which form a buffer in particular during replacement of an empty supply coil, to a holding apparatus 21. Seal profile 4 is held in holding apparatus 21 near its free end and can thus be positioned precisely with respect to vehicle door 15. Holding apparatus 21 furthermore enables tracking of seal profile 4 in order to enable a mounting of seal profile 4 on vehicle door 15.

Figure 10:
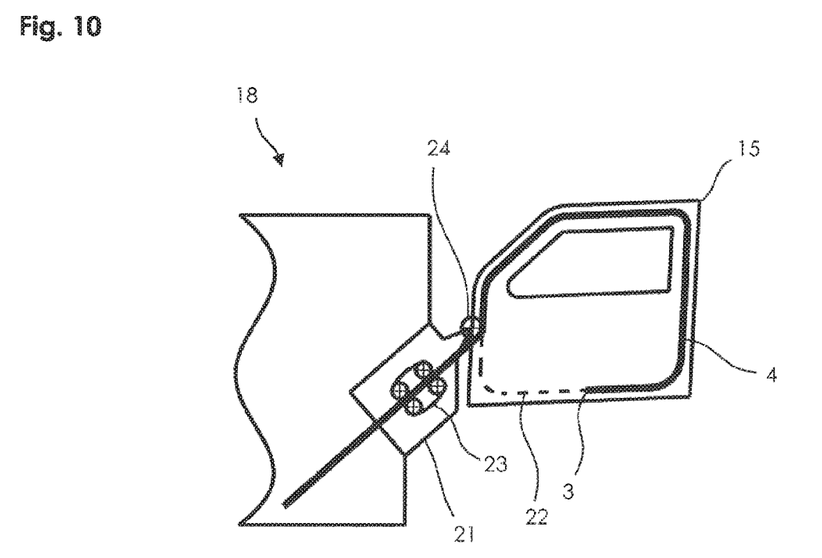
FIG. 10 shows a schematic representation of the mounting of the seal profile on the vehicle door from FIG. 9.

FIG. 10 shows a schematic representation of the mounting of seal profile 4 on vehicle door 15. As can be inferred there, vehicle door 15 is positioned by robot 17, not represented here, with respect to static holding apparatus 21 in such a manner that seal profile 4 can be fastened with holding apparatus 21 along a closed sealing membrane 22 to vehicle door 15.

In order to unwind seal profile 4 from supply coil 19, holding apparatus 21 comprises a transport apparatus 23 which comprises two conveyor belts in the case of this exemplary embodiment, between which conveyor belts seal profile 4 is clamped. At least one of the conveyor belts can be driven by a motor so that seal profile 4 can be transported and supplied very precisely.

Holding apparatus 21 furthermore comprises a pressure element 24 in the form of a pressure roller, by means of which seal profile 4 can be pressed along sealing membrane 22 on vehicle door 15. Proceeding from free profile end 3, seal profile 4 can thus be mounted on closed sealing membrane 22 until first profile end 3 is reached as a result of continuous further conveying of seal profile 4 and positioning of vehicle door 15 in such a manner that pressure element 24 is moved with seal profile 4 along sealing membrane 22. In order to cut seal profile 4 to length, holding apparatus 21 preferably also comprises a separating apparatus for cutting to length/separating seal profile 4.

If, during mounting of seal profile 4, profile end 3 was reached, profile end 3 can preferably be precisely detected by machine by means of corresponding detection apparatuses and seal profile 4 can be exactly cut to length in such a manner that no or only a very small gap is present between first profile end 3 and the second profile end which is produced by cutting to length. A shapeless bonding agent can subsequently be applied onto at least one of the profile ends by an application apparatus, not represented here, which can be integrated into holding apparatus 21. After heating of the shapeless bonding agent by a heating apparatus preferably to a melting temperature, the profile ends can subsequently be connected by the shapeless bonding agent, as a result of which an annular chassis sealing element is produced.

For exact positioning of the profile ends relative to one another and optionally for pulling apart of the profile ends prior to and pushing together of the profile ends after the application of the shapeless bonding agent, a positioning apparatus can furthermore be provided. As already generally described, the shapeless bonding agent can also be applied, for example, by means of a subcarrier. In terms of the configuration of the subcarrier, reference is made to the general description and the described further exemplary embodiments which can be readily combined.

In one alternative embodiment, holding apparatus 21 can also be formed to be movable and vehicle door 15 can be held statically so that holding apparatus 21 is moved with seal profile 4 along sealing membrane 22 on vehicle door 15 in order to mount seal profile 4 on vehicle door 15. This has the advantage that profile end 3 is not moved together with vehicle door 15 and therefore the shapeless bonding agent can be applied by means of an application apparatus onto profile end 3 possibly even more easily during mounting of seal profile 4. Further alternatively, instead of seal profile 4 which is provided as an endless cord in supply coil 19 and has a multiple length in terms of the length of the necessary chassis sealing element, a chassis sealing element cut to length in an upstream working step of a seal profile can also be fastened to vehicle door 15 by means of holding apparatus 21. Here, in a case of a chassis sealing element which has been cut to length in an accurately fitting manner, the process step of subsequent cutting to length on the vehicle door is dispensed with. If the chassis sealing element is previously cut to length with an oversize, this oversize must be removed after mounting on the vehicle door prior to connection of the profile ends. In relation to the further applicable alternative methods, reference is made to the general description and the description of the preceding figures, which can be readily combined.

With shown mounting device 14, however, not only the ends of a chassis sealing element can be connected to one another, rather it is also possible to place a chassis sealing element on a possibly already mounted further chassis sealing element and connect both chassis sealing elements to one another by means of the described method. This is in particular advantageous if different profile cross-sections are required in portions on the chassis so that the individual portions can be composed in a gap-free manner from individual chassis sealing elements and fixedly connected by means of the method. It is also possible in this manner to attach a chassis sealing element to a further laterally, i.e. between the ends, which is advantageous, for example, in the case of window seals.

LIST OF REFERENCE NUMBERS 1a, 1b Device for connecting the joint of two profile ends
2 Holding apparatus
3 First profile end
4 Seal profile
5 Hollow chamber
6 Template
7 Bonding agent
8 Second profile end
9 Further seal profile
10 Joint
11 Hollow chamber
12 Chassis
13 Subcarrier
14 Mounting device
15 Vehicle door
16 Base
17 Robot
18 Supply apparatus
19 Supply coil
20 Deflection rollers
21 Holding apparatus
22 Sealing membrane
23 Transport apparatus
24 Pressure element

The invention claimed is:

1. A method for connecting a joint of two ends of at least one chassis sealing element, comprising the steps of: initially arranging the two ends spaced apart from one another; applying a shapeless bonding agent onto at least one of the ends; subsequently heating the bonding agent; and
simultaneously or subsequently bringing the two ends into mutual contact so that the two ends are connected in a firmly bonded manner at the joint by the heated bonding agent, wherein the step of applying the bonding agent includes applying the bonding agent via a subcarrier onto the at least one end by contacting the at least one end to the subcarrier, wherein the subcarrier is a rigid plate, wherein the step of applying the bonding agent further includes moving the subcarrier into a gap between the two ends spaced apart from one another, positioning the shapeless bonding agent with respect to the at least one end, pushing the at least one end against the shapeless bonding agent on the subcarrier, transferring the shapeless bonding agent to the at least one end and removing the subcarrier from the gap between the two ends.

2. The method according to claim 1, wherein a bulk material, a fluid or a paste, is used as the shapeless bonding agent.

3. The method according to claim 2, including using powder or granulate as the bulk material.

4. The method according to claim 1, including electrostatically charging the subcarrier in order to hold the bonding agent.

5. The method according to claim 4, including electrostatically charging the subcarrier in a pointwise manner.

6. The method according to claim 1, including heating the bonding agent applied onto the at least one end with a heating apparatus or by a residual heat of the chassis sealing element from an upstream processing step.

7. The method according to claim 6, wherein the heating apparatus is an IR heating element, a hot air fan, a microwave generator or a laser.

8. The method according to claim 1, including heating the at least one end and/or the subcarrier prior to applying the bonding agent to improve adhesion on the at least one end or the subcarrier.

9. The method according to claim 8, including heating the at least one end and/or the subcarrier to a temperature below the melting temperature of the bonding agent prior to applying the bonding agent in order to enable adhesion.

10. The method according to claim 1, wherein portions of the at least one chassis sealing element and/or of a subcarrier onto which no bonding agent should be applied are covered using a template.

11. The method according to claim 1, wherein the bonding agent comprises a thermoplastic and/or duroplastic material.

12. The method according to claim 1, including forming the bonding agent in multiple layers from at least two components, wherein a first component is formed for connection to a first of the two ends and a second component for connection to a second of the two ends.

13. The method according to claim 1, including applying the shapeless bonding agent prior to fastening the chassis sealing element to a chassis of a vehicle and/or applying the shapeless bonding agent when the at least one chassis sealing element is fastened to a chassis of a vehicle at least in portions.

14. The method according to claim 1, further including cutting the chassis sealing element to length prior to fastening to a chassis of a vehicle in an exact manner or with oversize, or, removing the chassis sealing element from a supply coil and cutting the chassis sealing element to length after an at least partial fastening to the chassis of the vehicle.

15. The method according to claim 14, including applying the shapeless bonding agent onto an end of the chassis sealing element prior to cutting to length and/or applying the shapeless bonding agent onto at least one of the ends of the chassis sealing element after cutting to length.

16. The method according to claim 1, wherein the at least one chassis sealing element has no hollow chamber.

17. The method according to claim 1, wherein the at least one chassis sealing element has at least one hollow chamber.

18. The method according to claim 1, wherein the ends have an angle of 90° so as to be oriented perpendicular to a longitudinal direction of the chassis sealing element, or have an angle which deviates from 90° to the longitudinal direction of the chassis sealing element.

19. The method according to claim 18, wherein the ends have an angle of 45°.

\* \* \* \* \*